US012065145B2

(12) United States Patent
Diamond et al.

(10) Patent No.: US 12,065,145 B2
(45) Date of Patent: Aug. 20, 2024

(54) SYSTEMS AND METHODS FOR VEHICLE OCCUPANT PREPARATION FOR CERTAIN ACCELERATION MODES

(71) Applicant: Ford Global Technologies, LLC, Dearborn, MI (US)

(72) Inventors: Brendan Diamond, Grosse Pointe, MI (US); Keith Weston, Canton, MI (US); Jordan Barrett, Milford, MI (US); Andrew Lewandowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 17/659,280

(22) Filed: Apr. 14, 2022

(65) Prior Publication Data
US 2023/0331226 A1     Oct. 19, 2023

(51) Int. Cl.
*B60W 30/18*     (2012.01)
*B60R 22/48*     (2006.01)
(Continued)

(52) U.S. Cl.
CPC ....... *B60W 30/18027* (2013.01); *B60R 22/48* (2013.01); *B60W 50/16* (2013.01);
(Continued)

(58) Field of Classification Search
CPC ......... B60W 30/18027; B60W 30/182; B60W 50/16; B60W 50/082; B60W 50/14;
(Continued)

(56) References Cited

U.S. PATENT DOCUMENTS

| 10,752,252 | B2 | 8/2020 | Fung et al. | |
| 2020/0216078 | A1 | 7/2020 | Katz | |
| 2023/0237293 | A1* | 7/2023 | Karolak | G06K 7/1413 |
| | | | | 705/23 |

FOREIGN PATENT DOCUMENTS

| CN | 108515973 A | * | 9/2018 | ........... B60N 2/0232 |
| JP | 2004519788 A | * | 7/2004 | |

(Continued)

OTHER PUBLICATIONS

Wang Hong-yan, Zhao Ming-ming, Beurier Georges, Wang Xu-guang; Automobile Driver Posture Monitoring Systems: A Review [J]; China Journal of Highway and Transport, 2019 (02): 1-18 (Year: 2019).*

(Continued)

*Primary Examiner* — Michael J Zanelli
(74) *Attorney, Agent, or Firm* — Frank Lollo; Eversheds Sutherland (US) LLP

(57) ABSTRACT

The disclosure generally pertains to systems and methods for providing a vehicle occupant preparation system for certain acceleration modes. In an example method, sensor data associated with one or more sensors of the vehicle may be generated when a vehicle is in an acceleration mode.

(Continued)

Subsequently, an orientation of an occupant in the vehicle relative to a seat or other structure within an interior of the vehicle may be determined using the sensor data. The orientation of the occupant may comprise at least a position of a head of the occupant or a direction the head of the occupant is facing. It may be determined that the orientation of the occupant is not within a predetermined orientation threshold. A notification associated with the orientation of the occupant may then be presented. In some instances, a performance parameter of the vehicle may be adjusted.

17 Claims, 5 Drawing Sheets

(51) Int. Cl.
    *B60W 50/14*      (2020.01)
    *B60W 50/16*      (2020.01)
    *G06V 20/59*      (2022.01)

(52) U.S. Cl.
    CPC .... *G06V 20/597* (2022.01); *B60R 2022/4883* (2013.01); *B60W 2050/143* (2013.01); *B60W 2050/146* (2013.01); *B60W 2540/223* (2020.02); *B60W 2540/227* (2020.02); *B60W 2720/106* (2013.01)

(58) Field of Classification Search
    CPC ..... B60W 2050/143; B60W 2050/146; B60W 2540/223; B60W 2540/227; B60W 2720/106; B60R 22/48; B60R 2022/4883; G06V 20/597
    See application file for complete search history.

(56) References Cited

FOREIGN PATENT DOCUMENTS

JP      2012224286 A      11/2012
WO      WO-2021220190 A1 * 11/2021 ........... A61B 5/0205

OTHER PUBLICATIONS

Kumar et al.; Monitoring of Occupant States in Autonomous Vehicles Using Capacitance-Sensing Imaging; IEEE Sensors Journal, vol. 20, No. 21, Nov. 1, 2020 (Year: 2020).*
Interior Monitoring Systems, How monitoring the vehicle interior increases safety, comfort and convenience, Bosch Mobility Solutions, Jul. 25, 2021, 1-9.
Fraunhofer IOSB, Advanced Occupant Monitoring System for Activity Recognition in Cars, Sep. 1, 2021, 1-5.

* cited by examiner

SYSTEMS AND METHODS FOR VEHICLE OCCUPANT PREPARATION FOR CERTAIN ACCELERATION MODES

BACKGROUND

Some vehicles may be capable of achieving a high rate of acceleration through an acceleration mode, in which components of the vehicle may be preconditioned for optimal performance. In certain instances, an occupant of the vehicle may need to be prepared for the acceleration of the vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
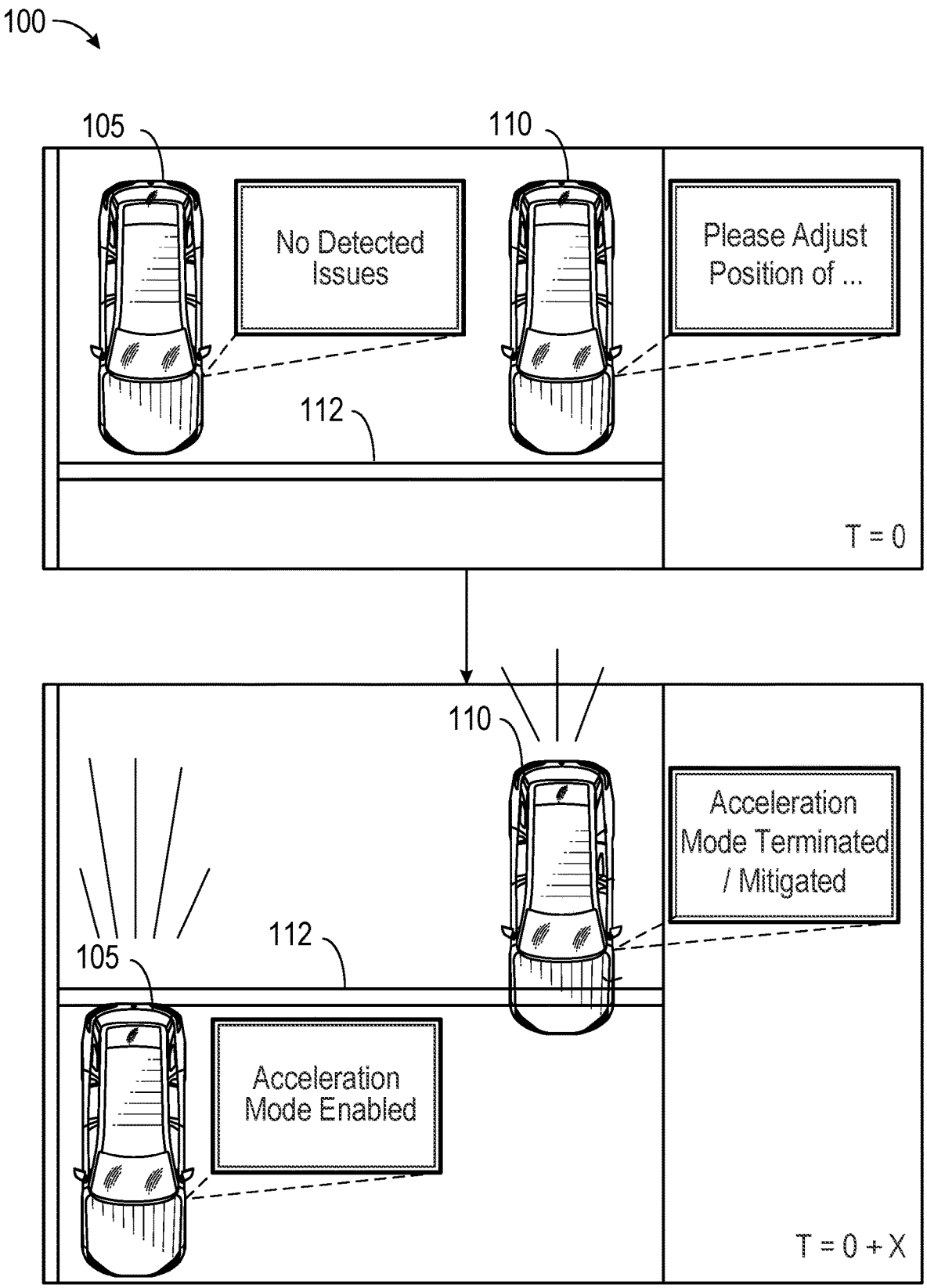
FIG. 1 illustrates an example implementation of a vehicle occupant preparation system in accordance with an embodiment of the disclosure.

In terms of a general overview, certain embodiments described in this disclosure are directed to systems and methods for providing a vehicle occupant preparation system for certain acceleration modes. In an example method, sensor data associated with one or more sensors of a vehicle may be generated when the vehicle is in an acceleration mode. An orientation of an occupant in the vehicle relative to a seat or other structure within an interior of the vehicle may be determined using the sensor data. The orientation of the occupant may comprise at least a position of a head of the occupant or a direction the head of the occupant is facing. The orientation of the occupant may then be determined to not be within a predetermined orientation threshold. A notification associated with the orientation of the occupant may be subsequently presented. In some embodiments, a performance parameter of the vehicle may be adjusted.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "user" may be used interchangeably with the word "driver" and the word "occupant." Either word as used herein refers to any individual that is in the vehicle that is detected to be in an acceleration mode. The word "device" may be any of various devices, such as, for example, a user device such as a smartphone or a tablet, a smart vehicle, and a computer. The word "sensor" may be any of various sensors that can be found in a vehicle, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example implementation of a vehicle occupant preparation system 100 in accordance with an embodiment of the disclosure. As depicted in FIG. 1, a first vehicle 105 and a second vehicle 110 may be located at a race track. The first vehicle 105 and the second vehicle 110 may both be configured so as to enable an acceleration mode when located at the race track or other similar locations. Both the first vehicle 105 and the second vehicle 110 may each have at least one occupant seated inside each vehicle.

In some embodiments, the first vehicle 105 and the second vehicle 110 may be configured to be in an acceleration mode when located at a start line 112 at the race track. In some embodiments, sensors at the first vehicle 105 may then be configured to generate sensor data associated with at least one sensor at the first vehicle 105. The sensors at the first vehicle 105 may be configured to identify various characteristics of the first vehicle 105, such as an orientation of each occupant in the first vehicle 105 relative to, for instance, a seat in the first vehicle 105. The various characteristics of the first vehicle 105 may refer to a position of one or more vehicle components, and the orientation of one or more occupants in the first vehicle 105 may refer to a position of a part of an occupant relative to the vehicle component(s), such as a position of a head of the occupant or a direction that the head of the occupant is facing relative to the vehicle or the vehicle component(s) thereof.

In some embodiments, sensors at the second vehicle 110 may then be configured to generate sensor data associated with at least one sensor at the second vehicle 110. The sensors at the second vehicle 110 may be configured to identify various characteristics of the second vehicle 110 and an orientation of each occupant in the second vehicle 110 relative to, for instance, a seat in the second vehicle 110. The various characteristics of the second vehicle 110 may refer to a position of one or more vehicle components, and the orientation of one or more occupants in the second vehicle 110 may refer to a position of a part of an occupant relative to the vehicle component(s), such as a position of a head of the occupant or a direction that the head of the occupant is facing relative to the vehicle or the vehicle component(s) thereof.

In some embodiments, the first vehicle 105 may detect that the occupants in the first vehicle 105 are all seated within a predetermined orientation threshold. In some embodiments, the second vehicle 110 may detect that the at least one occupant in the second vehicle 110 is not seated, that is, positioned, within a predetermined orientation threshold. Because the occupants within the first vehicle 105 are seated within the predetermined orientation threshold, the first vehicle 105 may remain in acceleration mode and proceed past the start line 112. As a result, the first vehicle 105 may launch with full performance parameters.

In some embodiments, because at least one occupant of the second vehicle 110 is not seated within the predetermined orientation threshold, the second vehicle 110 may not be allowed to remain in acceleration mode. Instead, notifications may be presented at the second vehicle 110 to instruct the occupant(s) on correcting their orientation/position in order to be within the predetermined orientation threshold. Notifications may be visual, auditory, and/or haptic. The second vehicle 110 may be configured to wait for a predetermined amount of time for the occupant(s) to correct their orientations/positions. If the occupant(s) correct their orientations/positions within the predetermined amount of time, and if the second vehicle 110 detects that the occupants are all seated within the predetermined orientation threshold within the predetermined amount of time, the second vehicle 110 may remain in acceleration mode and proceed past the start line 112, and may launch with full performance parameters. However, if the occupant(s) does not correct their orientations/positions within the predetermined amount of time, then the second vehicle 110 may be configured to terminate or mitigate the acceleration mode or launch the vehicle with adjusted performance parameters, such as reduced vehicle performance, based at least in part on the occupant's orientations/positions. For example, the second vehicle 110 may be prohibited from moving beyond the start line 112, or, as depicted in FIG. 1, the second vehicle 110 may be prohibited to move beyond the start line 112 without acceleration mode or with reduced vehicle performance in the acceleration mode.

In some embodiments, each of the first vehicle 105 and the second vehicle 110 may be configured to detect a position of each window and each seatbelt in each vehicle. In some embodiments, each of the first vehicle 105 and the second vehicle 110 may be configured to detect whether an occupant's arm(s) is outside of the vehicle and whether the vehicle driver has his or her hands on the steering wheel. If a position of each window and each seatbelt in each vehicle is not detected to be within a predetermined position threshold, or if an occupant's arm(s) is detected to be outside of the vehicle, or if the vehicle driver does not have his or her hands on the steering wheel, a corresponding vehicle may be configured to terminate or mitigate acceleration mode or launch the vehicle with adjusted performance parameters.

Figure 2:
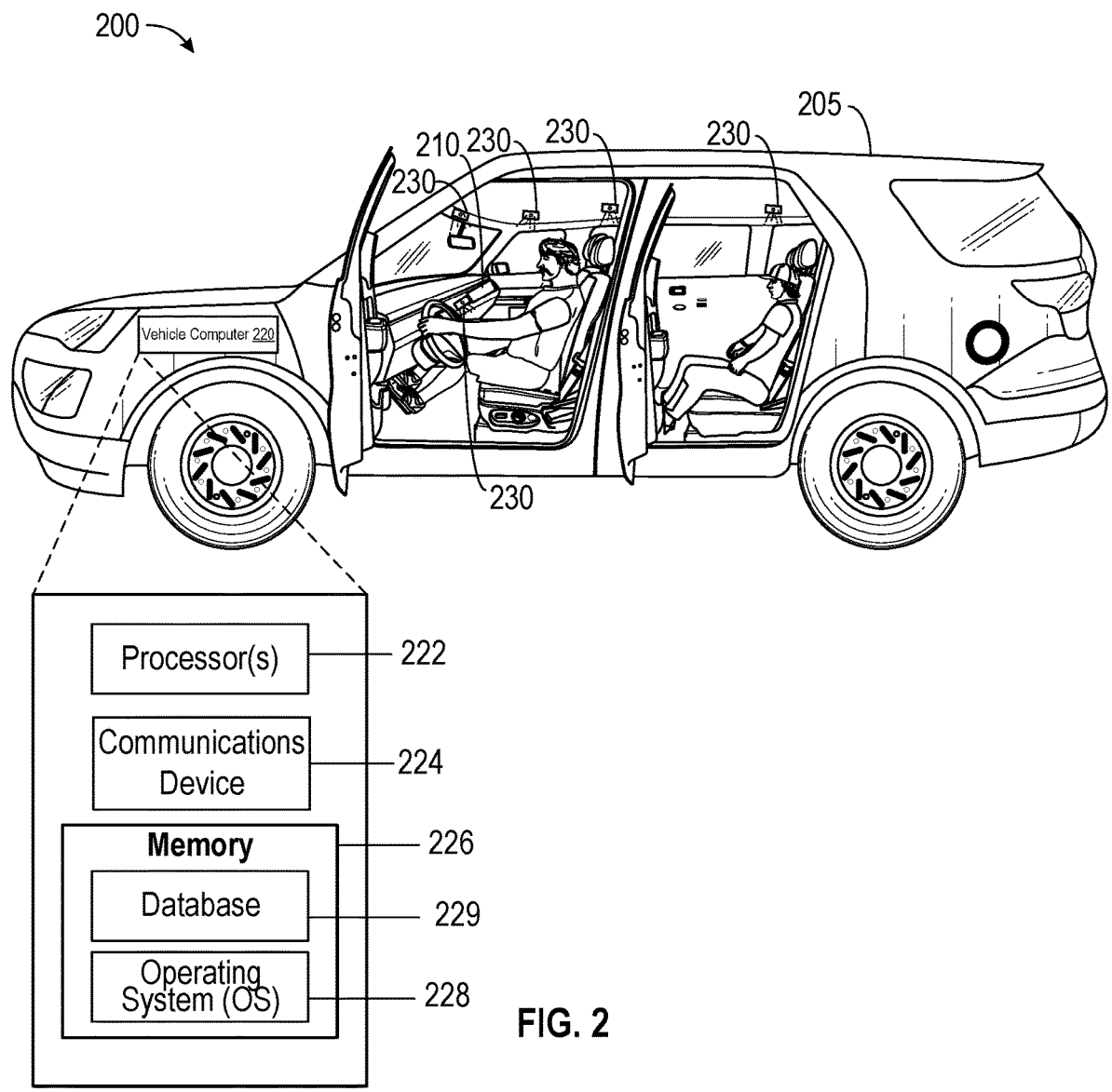
FIG. 2 illustrates an example implementation of a vehicle occupant preparation system in accordance with an embodiment of the disclosure.

FIG. 2 illustrates an example implementation of a vehicle occupant preparation system 200 in accordance with an embodiment of the disclosure. The vehicle occupant preparation system 200 may be carried out by a vehicle 205, which may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus, as long as the vehicle 205 is configured to be capable of activating an acceleration mode to enable the vehicle 205 to accelerate quickly.

The vehicle 205 may further include components such as, for example, a vehicle display 210 and a vehicle computer 220. The vehicle 205 may further include various types of sensors and detectors configured to provide various functionalities. For example, the vehicle 205 may include cameras and various sensors 230, such as interior cameras, seatbelt sensors, seat weight sensors, and other relevant sensors, in order for the vehicle 205 to detect characteristics associated with the occupants of the vehicle 205. In some embodiments, the vehicle display 210 may not be physically built into the vehicle 205, but may be wirelessly connected to the vehicle 205. In other embodiments, the vehicle display 210 may be detachable from the vehicle 205. In yet other embodiments, the vehicle display 210 may be built into the vehicle 205.

In some embodiments, the vehicle computer 220 may include a processor 222, a communications device 224, and a memory 226. It must be understood that the memory 226 is a functional block that can be implemented in hardware, software, or a combination thereof. The processor 222 may carry out various operations by executing computer-readable instructions stored in the memory 226. The memory 226, which is one example of a non-transitory computer-readable medium, may be used to store a database 229 for storing data and an operating system (OS) 228.

In some embodiments, the various components of the vehicle computer 220 may be communicatively coupled to each other via wired and/or wireless connections. More particularly, the various components of the vehicle computer 220 may be communicatively coupled to the vehicle 205 via a vehicle bus that uses a controller area network (CAN) bus protocol, a Media Oriented Systems Transport (MOST) bus protocol, and/or a CAN flexible data (CAN-FD) bus protocol. In another embodiment, the communications may be provided via wireless technologies such as Bluetooth®, Ultra-Wideband (UWB), cellular, Wi-Fi, ZigBee®, or near-field communications (NFC).

In some embodiments, the vehicle display 210 and the vehicle computer 220 are configured to communicate via a network with devices located outside the vehicle 205, such as, for example, a computer (a server computer, a cloud computer, etc.), a cloud storage device, and or a user device (a mobile phone, a laptop, a tablet, etc.).

The network may include any one, or a combination of networks, such as, for example, a local area network (LAN), a wide area network (WAN), a telephone network, a cellular network, a cable network, a wireless network, and/or private/public networks such as the Internet. The network may support any of various communications technologies, such as, for example, TCP/IP, Bluetooth®, near-field communication (NFC), Wi-Fi, Wi-Fi Direct, Ultra-Wideband (UWB), cellular, machine-to-machine communication, and/or man-to-machine communication.

In some embodiments, the vehicle 205 may be configured to identify requirements associated with vehicle occupants when the acceleration mode is enabled. For example, requirements may relate to an orientation of each vehicle occupant relative to their seat in the vehicle 205. In some embodiments, a variety of internal sensors at the vehicle 205 may be used to determine the number of occupants in the vehicle 205 and physical characteristics associated with each occupant in the vehicle 205, such as a height and/or weight of each occupant. In some embodiments, the variety of internal sensors 230 may include interior cameras, seatbelt sensors, seat weight sensors, and other relevant sensors that may assist in the determination of whether each passenger is within a predetermined orientation threshold. The vehicle 205 may be configured to perform image recognition on images and/or video feed obtained by interior cameras of the vehicle 205.

In some embodiments, after the number of occupants in the vehicle 205 has been determined and the physical characteristics of each occupant 205 have been determined, the vehicle occupant preparation system 200 may be configured to scan the vehicle 205 via the internal cameras and/or vehicle sensors 230 for an orientation/position of one or more vehicle occupant(s) relative to the seat or other structure within the interior of the vehicle 205 that the vehicle occupant(s) is seated in. The orientation/position of the vehicle occupant(s) may include a head position of the occupant relative to the headrest of a seat of the vehicle, a head position of the occupant relative to the roof of the vehicle, a head position of the vehicle occupant relative to another component of the vehicle, and/or a direction that the head of the occupant is facing relative to the vehicle or one or more components thereof.

In some embodiments, the vehicle 205 may detect that one or more occupant(s) is not within a predetermined orientation threshold if certain conditions are not met based on sensor data from the vehicle sensors 230 and/or image recognition performed on the images and/or video feed obtained by the vehicle cameras. For example, if an occupant's head is not positioned against the headrest of a seat or within a predetermined distance from the headrest of a seat, the vehicle 205 may detect that an occupant is not within a predetermined orientation threshold. In another example, if interior cameras of the vehicle 205 detect that an occupant's head may come into contact with the roof of the vehicle 205 or any other component of the vehicle 205 except the headrest during acceleration, the vehicle 205 may detect that an occupant is not within a predetermined orientation threshold. In another example, if an occupant's head is not facing straight ahead towards the front of the vehicle, the vehicle 205 may detect that an occupant is not within a predetermined orientation threshold.

In some embodiments, vehicle sensors 230 within the vehicle 205 may determine whether the one or more occupants of the vehicle 205 have their arms within the vehicle 205. If the one or more occupants of the vehicle 205 have one or more arms outside the vehicle, the vehicle 205 may detect that the occupant is not within a predetermined orientation threshold. In some embodiments, vehicle sensors within the vehicle 205 may determine whether one or more occupants in the vehicle 205 has attached and properly secured their seatbelt. Proper securing of a seatbelt may refer to the positioning of each strap on the seatbelt, for example, the positioning of one strap over an occupant's shoulder and another strap over an occupant's midsection. If an occupant has not attached and properly secured his or her seatbelt, the vehicle 205 may detect that an occupant is not within a predetermined orientation threshold. In some embodiments, window sensors at the vehicle 205 may determine whether vehicle windows are closed and whether each occupant's arms are inside the vehicle 205. If a vehicle window is not closed or an occupant's arms are detected to be outside of the vehicle 205, the vehicle 205 may detect that an occupant is not within a predetermined orientation threshold. In some embodiments, interior cameras may be used to determine whether a vehicle driver has his or her hands on the steering wheel of the vehicle 205. If the vehicle driver does not have his or her hands on the steering wheel, the vehicle 205 may determine that the driver is not within a predetermined orientation threshold.

In some embodiments, the vehicle cameras at the vehicle 205 may be configured to detect if each occupant of the vehicle 205 is wearing appropriate equipment, such as goggles, a helmet, or other appropriate equipment. If each occupant is not wearing appropriate equipment, the vehicle 205 may determine that the driver is not within a predetermined orientation threshold.

In some embodiments, if an occupant is not within a predetermined orientation threshold, the vehicle 205 may be configured to provide a notification via the vehicle 205 that the occupant is not within a predetermined orientation threshold. In some embodiments, the notification may be a visual notification via a human machine interface at the vehicle 205, an audio notification via speakers in the vehicle 205, or a haptic notification via a vehicle component in the vehicle 205. The human machine interface may be a vehicle display, such as the vehicle display 210, on an infotainment system of the vehicle 205 or a windshield of the vehicle 205. The vehicle 205 may be configured to wait for a predetermined amount of time for the occupant to correct his or her orientation in order to be within the predetermined orientation threshold. In some embodiments, the predetermined amount of time may refer to a timer countdown until vehicle launch. The notification may further include the predetermined amount of time. If the vehicle 205 detects that the occupant has corrected his or her orientation within the predetermined amount of time such that the occupant is within the predetermined orientation threshold, the vehicle 205 may be configured to activate acceleration mode. In some embodiments, if the vehicle 205 detects that the occupant has not corrected his or her orientation within the predetermined amount of time, the vehicle 205 may be configured to take corrective action. In some embodiments, corrective action may include terminating the vehicle's 205 ability to activate acceleration mode or adjusting performance parameters of the vehicle 205 in the acceleration mode based on the occupants' orientation. In some embodiments, the performance parameters may be adjusted by limiting a vehicle's 205 speed and/or de-rating a vehicle's 205 power.

In some embodiments, the vehicle 205 may be further configured to inspect items present in the vehicle 205. For example, interior cameras at the vehicle 205 may detect whether food, drinks, cargo, or other objects may be present in the vehicle 205. If any objects detected in the vehicle 205 are not secured, the vehicle 205 may present a notification to the occupants to either remove the loose items from the vehicle or to secure the loose items to the vehicle 205. If the loose items are not removed or secured to the vehicle, the vehicle's 205 ability to activate acceleration mode may be terminated or the performance parameters of the vehicle 205 may be adjusted. In some embodiments, if the loose item is a cup, the notification may notify the occupants to put the cups in the cup holders of the vehicle 205. In some embodiments, the vehicle 205 may be configured to increase the grip of each cup holder when the vehicle 205 is in acceleration mode. In some embodiments, if the loose item is cargo, internal sensors 230 and interior cameras of the vehicle 205 may be further configured to determine a weight and/or type of cargo. In some embodiments, the notification may instruct an occupant to put away a mobile device if the vehicle 205 detects that an occupant is using a mobile device.

Figure 3:
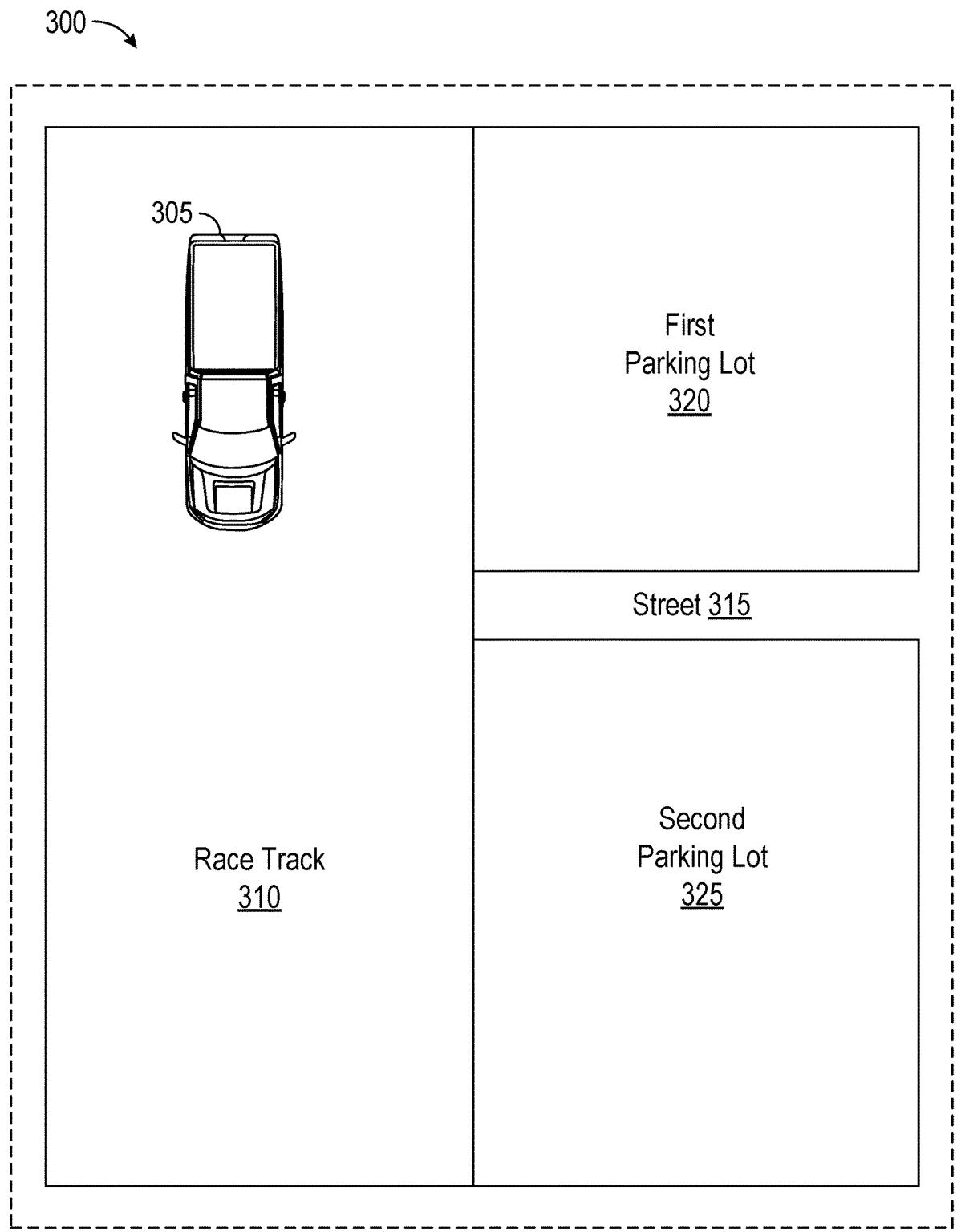
FIG. 3 illustrates an example implementation of a vehicle occupant preparation system in accordance with an embodiment of the disclosure.

FIG. 3 illustrates an example implementation of a vehicle occupant preparation system 300 in accordance with an embodiment of the disclosure. The vehicle occupant preparation system 300 may be carried out by a vehicle 305 that is configured to be capable of activating an acceleration mode.

In some embodiments, through geofencing of various locations, the vehicle 305 may be configured to only be capable of activating the acceleration mode when the vehicle 305 is determined to be in a location that is appropriate for the acceleration mode. For example, a location that is appropriate for the acceleration mode may include a race track or similar location. For example, as depicted in FIG. 3, the vehicle 305 may be configured to be capable of activating the acceleration mode when the vehicle 305 is located at a race track 310. When the vehicle 305 is determined to be located on a street 315, a first parking lot 320, or a second parking lot 325, the vehicle 305 may be configured to not be capable of activating the acceleration mode. In some embodiments, the location of the vehicle 305 may be determined through location data associated with the vehicle 305, for example, GPS data associated with vehicle sensors at the vehicle 305. In some embodiments, the location of the vehicle 305 may be determined through images and/or video feed taken by vehicle cameras at the vehicle 305.

In some embodiments, the geofencing may be associated with the implementation of additional requirements for occupants of the vehicle 305. For example, when the vehicle 305 is determined to be at the race track 310, the vehicle 305 may be configured to be capable of activating the acceleration mode. Upon detecting that the vehicle 305 is at the race track 310, the vehicle 305 may be further configured to implement additional requirements before acceleration mode can be detected. For example, the race track 310 may have certain requirements for vehicle occupants in order for the vehicle occupants to use the race track. In some embodiments, the race track 310 may upload its requirements to a cloud server, which the vehicle 305 may then access when the vehicle 305 is located at the race track 310. In one example, the race track 310 may require all vehicle occupants to wear a helmet while being in the vehicle 305. As a result of this requirement, the vehicle 305 may be configured to detect whether or not each occupant of the vehicle 305 is wearing a helmet, and the vehicle 305 may only be configured to activate acceleration mode when the vehicle 305 has confirmed that all vehicle occupants are wearing helmets.

Figure 4:
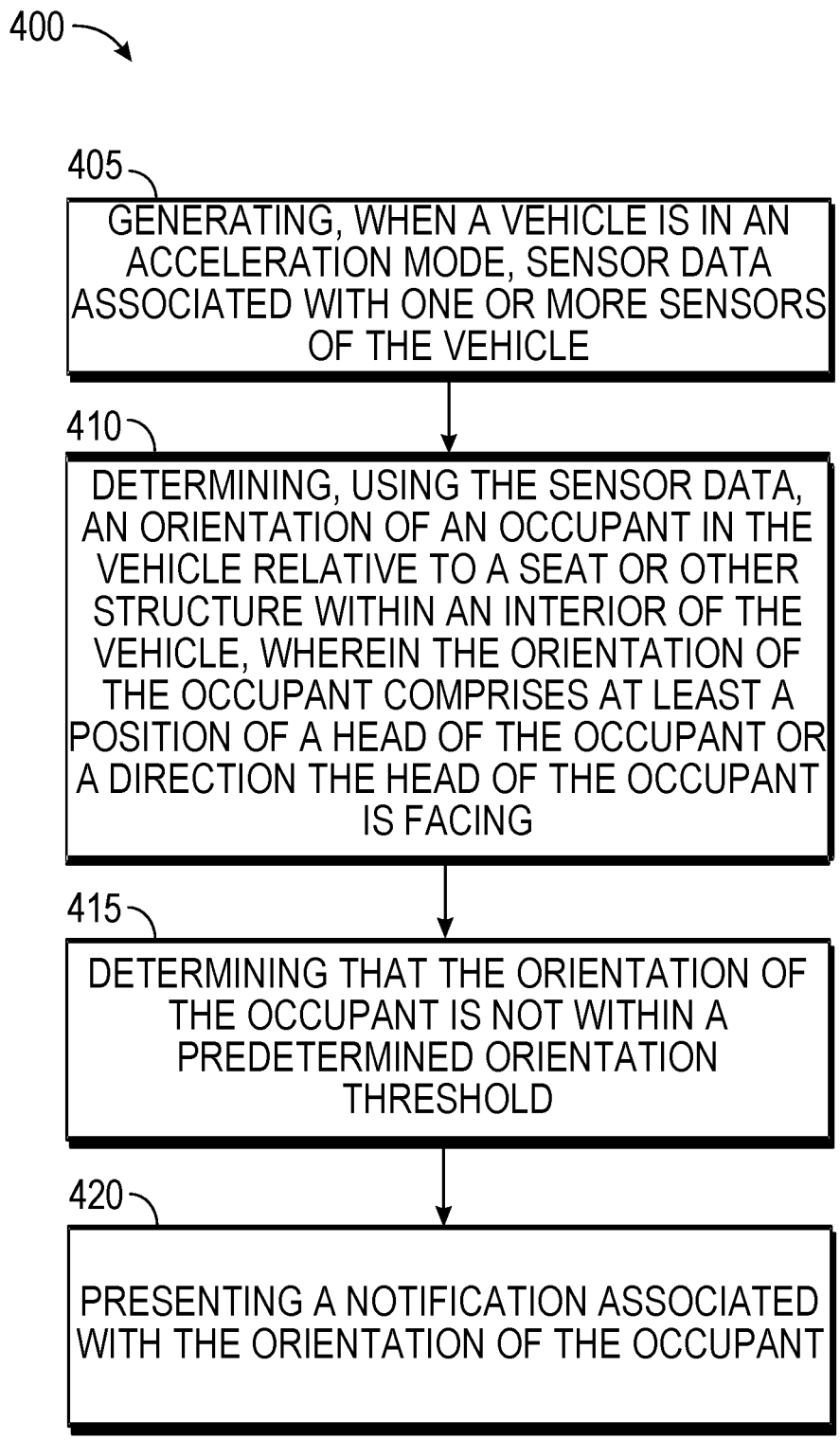
FIG. 4 depicts a flow chart of an example method for providing a vehicle occupant preparation system in accordance with the disclosure.

FIG. 4 shows a flow chart 400 of an example method of providing a vehicle occupant preparation system in accordance with the disclosure. The flow chart 400 illustrates a sequence of operations that can be implemented in hardware, software, or a combination thereof. In the context of software, the operations represent computer-executable instructions stored on one or more non-transitory computer-readable media such as a memory 226 provided in the vehicle computer 220, that, when executed by one or more processors such as the processor 222 provided in the vehicle computer 220, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 400 may be carried out by the vehicle computer 220 either independently or in cooperation with other devices such as, for example, other components of the vehicle 205, cloud elements (such as, for example, a computer, or cloud storage).

At block 405, sensor data associated with one or more sensors of a vehicle may be generated when the vehicle is in an acceleration mode.

At block 410, an orientation of an occupant in the vehicle relative to a seat or other structure within an interior of the vehicle may be determined using the sensor data. The orientation of the occupant may include at least a position of a head of the occupant or a direction that the head of the occupant is facing. In addition or in the alternative, the orientation of the occupant may include a position and/or a direction of a torso, a pelvic area, an arm, a leg, a foot, or any other body part of the occupant.

At block 415, the orientation of the occupant may be determined to not be within a predetermined orientation threshold. In some embodiments, a position of at least one component of the vehicle may be determined. In some embodiments, the position of the at least one component of the vehicle may be determined to not be within a predetermined position threshold. In some embodiments, the at least one component of the vehicle may be a seatbelt of the vehicle and/or a window of the vehicle.

At block 420, a notification associated with the orientation of the occupant may be presented. In some embodiments, the notification may be a visual notification, an audio notification, and/or a haptic notification. In some embodiments, a performance parameter of the vehicle may be adjusted. In some embodiments, the adjustment of the performance parameter may include terminating the acceleration mode or reducing vehicle performance in the acceleration mode.

In some embodiments, a location of the vehicle may be determined based on location data associated with the one or more sensors of the vehicle. At least one requirement associated with the location may then be determined in order for the vehicle to remain in the acceleration mode.

Figure 5:
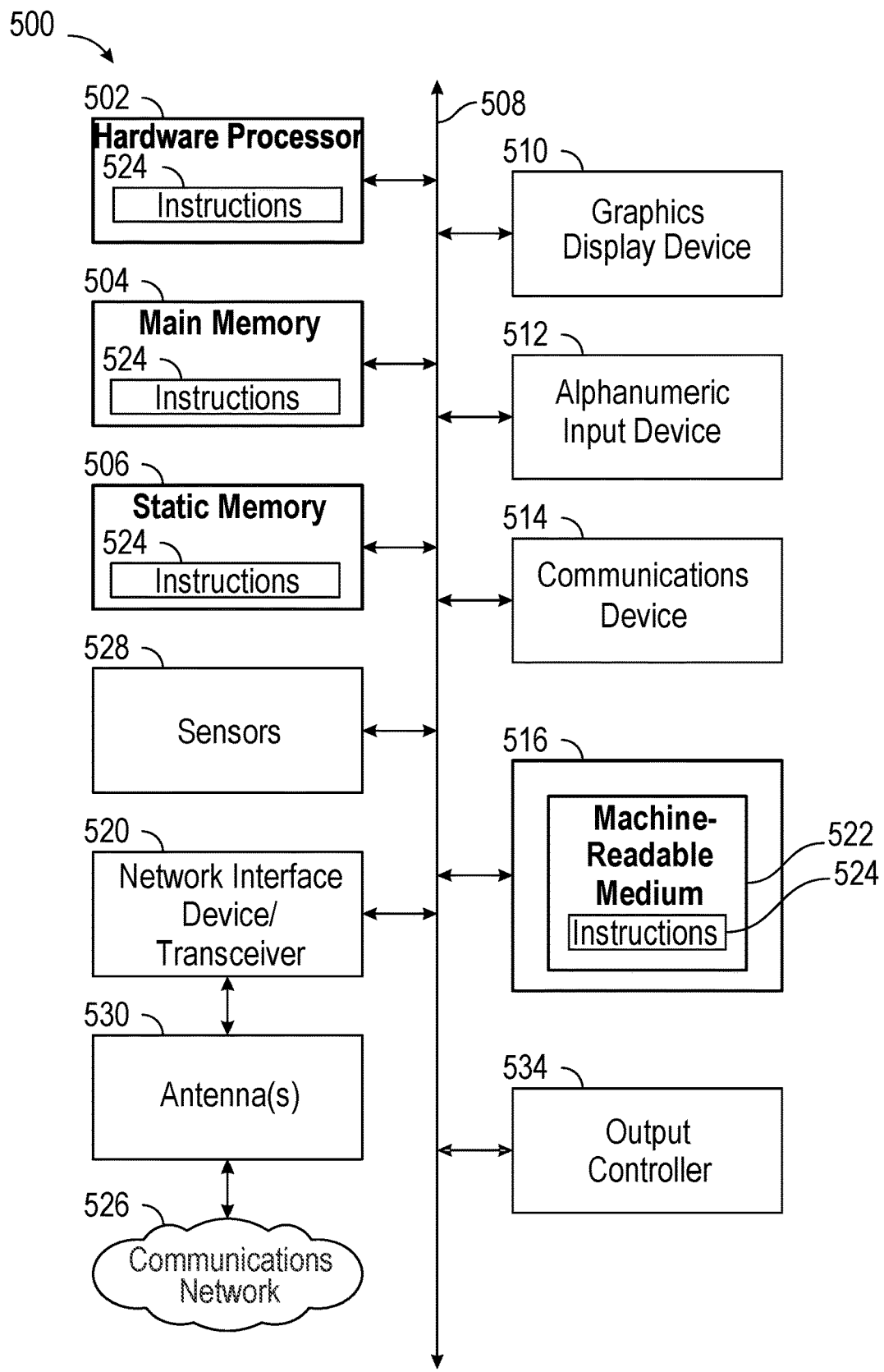
FIG. 5 depicts a block diagram of an example machine upon which any of one or more techniques (e.g., methods) may be performed, in accordance with an embodiment of the disclosure.

FIG. 5 depicts a block diagram of an example machine 500 upon which any of one or more techniques (e.g., methods) may be performed, in accordance with one or more example embodiments of the present disclosure. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 500 may be the vehicle 205, as depicted in FIG. 2. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a graphics display device 510, an alphanumeric input device 512 (e.g., a keyboard), and a communications device 514. In an example, the graphics display device 510, the alphanumeric input device 512, and the communications device 514 may be a touch screen display. The machine 500 may additionally include a storage device (i.e., drive unit) 516, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth¬, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 222, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 226, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
generating, when a vehicle is in an acceleration mode, sensor data associated with one or more sensors of the vehicle;
determining, using the sensor data, an orientation of an occupant in the vehicle relative to a seat or other structure within an interior of the vehicle, wherein the orientation of the occupant comprises at least a position of a head of the occupant or a direction the head of the occupant is facing;
determining that the orientation of the occupant is not within a predetermined orientation threshold; and
presenting a notification associated with the orientation of the occupant; and
adjusting, based on the orientation of the occupant, a performance parameter of the vehicle.

2. The method of claim 1, wherein the adjustment of the performance parameter of the vehicle comprises terminating the acceleration mode or reducing vehicle performance in the acceleration mode.

3. The method of claim 1, further comprising:
determining a location of the vehicle based on location data associated with the one or more sensors of the vehicle; and
determining at least one requirement associated with the location for the vehicle to remain in the acceleration mode.

4. The method of claim 1, further comprising:
determining a position of at least one component of the vehicle; and
determining that the position of the at least one component of the vehicle is not within a predetermined position threshold, wherein presenting the notification is based on the position of the at least one component.

5. The method of claim 4, wherein the at least one component of the vehicle comprises at least one of a seatbelt of the vehicle or a window of the vehicle.

6. The method of claim 1, wherein the notification comprises at least one of a visual notification, an audio notification, or a haptic notification.

7. A device, comprising:
at least one memory device that stores computer-executable instructions; and at least one processor configured to access the at least one memory device, wherein the at least one processor is configured to execute the computer-executable instructions to:
- generate, when a vehicle is in an acceleration mode, sensor data associated with one or more sensors of the vehicle;
- determine, using the sensor data, an orientation of an occupant in the vehicle relative to a seat or other structure within an interior of the vehicle, wherein the orientation of the occupant comprises at least a position of a head of the occupant or a direction the head of the occupant is facing;
- determine that the orientation of the occupant is not within a predetermined orientation threshold; and
- present a notification associated with the orientation of the occupant; and
- adjusting, based on the orientation of the occupant, a performance parameter of the vehicle.

8. The device of claim 7, wherein the adjustment of the performance parameter of the vehicle comprises terminating the acceleration mode or reducing vehicle performance in the acceleration mode.

9. The device of claim 7, wherein the at least one processor is further configured to execute the computer-executable instructions to:
- determine a location of the vehicle based on location data associated with the one or more sensors of the vehicle; and
- determine at least one requirement associated with the location for the vehicle to remain in the acceleration mode.

10. The device of claim 7, wherein the at least one processor is further configured to execute the computer-executable instructions to:
- determine a position of at least one component of the vehicle; and
- determine that the position of the at least one component of the vehicle is not within a predetermined position threshold, wherein presenting the notification is based on the position of the at least one component.

11. The device of claim 10, wherein the at least one component of the vehicle comprises at least one of a seatbelt of the vehicle or a window of the vehicle.

12. The device of claim 7, wherein the notification comprises at least one of a visual notification, an audio notification, or a haptic notification.

13. A non-transitory computer-readable medium storing computer-executable instructions which, when executed by a processor, cause the processor to perform operations comprising:
- generating, when a vehicle is in an acceleration mode, sensor data associated with one or more sensors of the vehicle, wherein the sensor data includes location data of the vehicle;
- determining, using the sensor data, an orientation of an occupant in the vehicle relative to a seat or other structure within an interior of the vehicle, wherein the orientation of the occupant further comprises at least a position of a head of the occupant or a direction the head of the occupant is facing;
- determining a requirement that is based on the location data of the vehicle; and
- presenting a notification of the requirement that is based on the location of the vehicle to remain in the acceleration mode.

14. The non-transitory computer-readable medium of claim 13, wherein the operations further comprise:
- adjusting, based on the orientation of the occupant, a performance parameter of the vehicle.

15. The non-transitory computer-readable medium of claim 14, wherein the adjustment of the performance parameter of the vehicle comprises terminating the acceleration mode or reducing vehicle performance in the acceleration mode.

16. The non-transitory computer-readable medium of claim 13, wherein the operations further comprise:
- determining a position of at least one component of the vehicle; and
- determining that the position of the at least one component of the vehicle is not within a predetermined position threshold, wherein presenting the notification is based on the position of the at least one component.

17. The non-transitory computer-readable medium of claim 16, wherein the at least one component of the vehicle comprises at least one of a seatbelt of the vehicle or a window of the vehicle.

* * * * *